United States Patent
Latarnik et al.

(10) Patent No.: US 6,533,367 B1
(45) Date of Patent: Mar. 18, 2003

(54) SYSTEM FOR CONTROLLING THE TRACTION SLIP OF A VEHICLE

(75) Inventors: Michael Latarnik, deceased, late of Friedrichsdorf (DE), by Christine Latarnik, Sylvia-Monika Latarnik, and Eva-Maria Latarnik, legal representatives; Harald Kahl, Limburg (DE); Siegfried Halat, Darmstadt (DE); Ulrich Stöckmann, Darmstadt (DE); Bernd-Uwe Hartmann, Gründau (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/701,909

(22) PCT Filed: May 12, 1999

(86) PCT No.: PCT/EP99/03280

§ 371 (c)(1),
(2), (4) Date: Apr. 24, 2001

(87) PCT Pub. No.: WO99/64280

PCT Pub. Date: Dec. 16, 1999

(30) Foreign Application Priority Data

Oct. 27, 1998 (DE) .......................... 198 49 407
Jun. 5, 1998 (DE) .......................... 198 25 272

(51) Int. Cl.$^7$ ................................ B60T 8/24
(52) U.S. Cl. .................. 303/139; 303/148; 303/113.2; 701/73
(58) Field of Search ................ 303/139, 148, 303/149, 150, 163, 164, 113.2; 701/83, 73; 180/197

(56) References Cited

U.S. PATENT DOCUMENTS

| 5,205,622 A | * | 4/1993 | Gee .................. 303/113.2 |
| 5,224,766 A | * | 7/1993 | Oikawa et al. .......... 303/148 |
| 5,275,474 A | | 1/1994 | Chin et al. ............. 303/148 |
| 5,292,188 A | * | 3/1994 | Okazaki ................ 303/111 |
| 5,312,171 A | * | 5/1994 | Schafer ................ 303/139 |
| 5,322,356 A | * | 6/1994 | Kolbe et al. ........... 303/139 |
| 5,564,800 A | * | 10/1996 | Fischle et al. .......... 303/140 |
| 5,688,029 A | * | 11/1997 | Bach et al. ............ 303/139 |
| 5,826,950 A | * | 10/1998 | Jonner et al. .......... 303/113.2 |
| 5,980,000 A | * | 11/1999 | Kolbe et al. ........... 303/139 |
| 6,125,314 A | * | 9/2000 | Graf et al. ............. 701/53 |

FOREIGN PATENT DOCUMENTS

| DE | 40 22 471 | 1/1992 |
| DE | 40 34 816 | 5/1992 |
| DE | 43 23 275 | 1/1995 |
| DE | 44 21 565 | 12/1995 |
| DE | 195 37 439 | 4/1997 |
| DE | 196 48 055 | 6/1998 |
| EP | 0 498 355 | 8/1992 |

OTHER PUBLICATIONS

Search Report of the German Patent Office for Application No. 198 49 407.6.

* cited by examiner

Primary Examiner—Jack Lavinder
Assistant Examiner—Mariano Sy
(74) Attorney, Agent, or Firm—Rader, Fishman & Grauer PLLC

(57) ABSTRACT

A method for controlling the traction slip of a vehicle on a roadway with sidewise different coefficients of friction includes the following steps: identifying a driving situation on a roadway with sidewise different coefficients of friction and, when the driving situation is identified and traction slip is encountered on both wheels, decreasing the brake pressure of the driven wheel on the low coefficient-of-friction side. A device for controlling the traction slip of a vehicle on a roadway with sidewise different coefficients of friction includes a determining device for determining a driving situation on a roadway with sidewise different coefficients of friction, and a brake actuation control which decreases the brake pressure of the driven wheel on the low coefficient-of-friction side when the driving situation is identified and traction slip is encountered on both wheels.

22 Claims, 2 Drawing Sheets

SYSTEM FOR CONTROLLING THE TRACTION SLIP OF A VEHICLE

TECHNICAL FIELD

The present invention generally relates to vehicle stability control, and more particularly relates to a method and a device for controlling the traction slip of a vehicle on a roadway with sidewise different coefficients of friction.

BACKGROUND OF THE INVENTION

Traction slip principally means that one or more vehicle wheels rotate faster than a wheel speed that corresponds to the current driving speed of the vehicle. This is mostly the case when the driving torque exceeds the torque which can be transmitted between the wheels and the roadway due to the frictional conditions prevailing between them.

FIG. 1 is a schematic view of a vehicle from the top. Reference numeral 11 relates to the left front wheel, 12 to the right front wheel, 13 to the right rear wheel, and 14 to the left rear wheel. When the vehicle has a front-wheel drive, traction slip can occur at wheels 11, 12. To reduce traction slip, it is either possible to reduce the engine torque, or brake pressure can be built up to decelerate the spinning wheels. The latter action is chosen especially in the presence of low rotational speeds when the reduction of the engine torque is scarcely possible.

Comparatively unfavorable driving situations may exist. For example, the sides of a roadway may be split with respect to coefficients of friction, e.g. in such a way that the right-hand wheels run on a low coefficient of friction (roadway is wet, full of sand, slippery), while the left-hand wheels run on a high coefficient of friction (roadway is dry). In FIG. 1, this is represented by hatched lines 17 which is meant to show the roadway areas having a low coefficient of friction. Without traction slip control, the case may occur that the driven wheel on a low coefficient of friction (e.g. 12) spins, while the wheel on a high coefficient of friction is hardly driven due to the effect of the differential. Traction is poor then and destabilizing.

Wheel-related traction slip control systems are known in the art (for example BTCS='brake traction control system') which control the wheel slip on each individual wheel. Sometimes high traction slip values are required in difficult situations during starting-to-drive maneuvers which must not be suppressed in terms of control in order not to render starting to drive impossible. If in such unfavorable situations, for example, when driving uphill on split coefficients of friction, traction slip develops on the high coefficient-of-friction side as well, the build-up of brake pressure will impair the comfort and, possibly, also cause loss in traction.

On the other hand, there are traction slip control systems which control the traction slip on one wheel only, but in doing so also consider the behavior of another wheel (for example, EDL='electronic differential lock') under certain conditions. The objective of these systems in terms of control, especially in the presence of major differences in coefficients of friction, is to develop brake pressure only on the side having a low coefficient of friction, in order to make the entire engine output available for traction. Admittedly, these systems control the brake pressure on the low coefficient-of-friction side also in dependence on the behavior of the driven wheel on the high coefficient-of-friction side. However, when traction slip develops on the high coefficient-of-friction side, the shortcoming involved is loss in traction due to a considerable reduction of the supporting torque and a reduced comfort due to a high amount of traction slip on the low coefficient-of-friction side. No intervention is made on roadways having the same coefficients of friction on both sides and, therefore, approximately the same amount of traction slip on all driven wheels.

An object of the present invention is to provide a method and a device for controlling the traction slip of a vehicle on a roadway with sidewise different coefficients of friction which permit maximizing traction and involve least possible impairment of comfort.

Initially, the driving situation on a roadway with sidewise different coefficients of friction is identified. Identification may be performed, for example, by comparing the amounts of slip on the wheels of the driven axle. When the amounts of slip are obviously different, this indicates a driving situation with split coefficients of friction. Instead of the amounts of slip, however, the respective wheel speeds may also be chosen for consideration (because the amounts of slip are respectively calculated as a difference between the wheel speed and the vehicle reference speed).

To counteract loss in traction, the brake pressure on the driven wheel on the low coefficient-of-friction side may be decreased when traction slip occurs on both wheels of the driven axle. Although this causes higher traction slip on the low coefficient-of-friction side, it also produces (due to the differential) a lower slip amount on the high coefficient-of-friction side, in the most favorable case, it effects new grip of this wheel and, hence, an improved traction, a constant drive and, thus, driving comfort which is reduced only inconsiderably.

A traction slip control device includes an identification device for identifying the split coefficients of friction on the roadway and a brake actuation control which reduces the brake pressure on the low coefficient-of-friction side in the event of split coefficients of friction and traction slip that prevails on both sides. The brake actuation control may be a part of a comprehensive brake control system which fulfills different control objectives such as that of an anti-lock system or electronic stability optimization. In particular, the traction slip control according to the present invention may be a part of a prior art traction slip control system. It is preferably configured as a supplement to traction slip control on each individual wheel. Thus, it may e.g. add to the BTCS mentioned hereinabove.

DETAILED DESCRIPTION OF THE PREFERRED EMBODIMENTS

Figure 1:
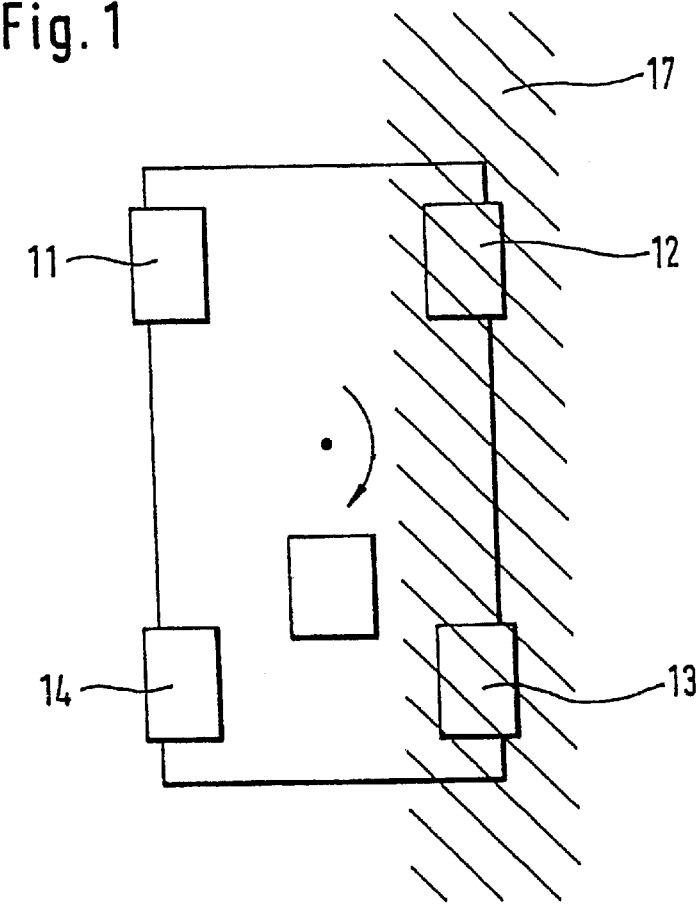
FIG. 1 is a schematic top view of a vehicle.
Figure 2:
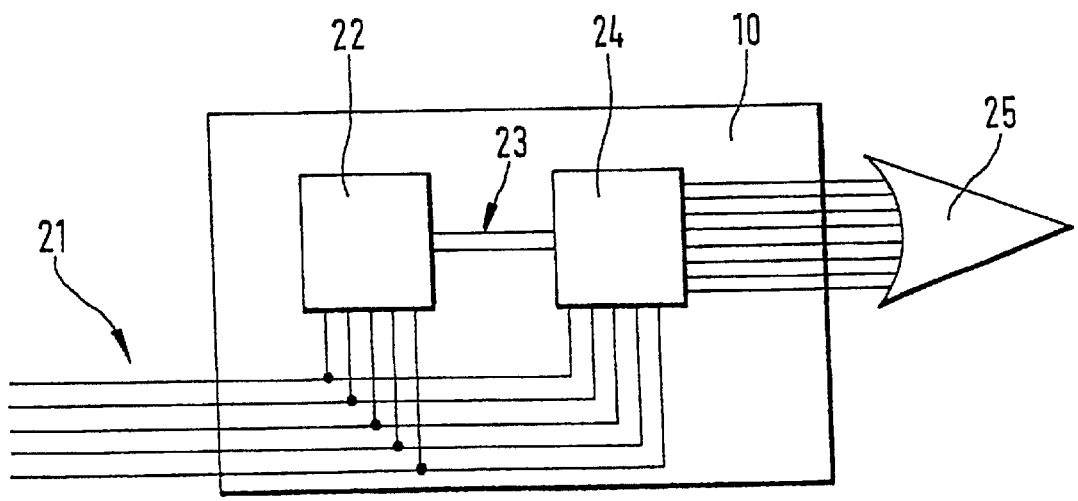
FIG. 2 is a schematic block diagram showing the components of traction slip control which are essential for this invention.

The embodiment of FIG. 2 shows a traction slip control which includes an identification device 22 and a brake actuation control 24. In general, the components described hereinabove may be configured to implement the method steps which have also been described, and method steps may be performed corresponding to the individual components described.

Different tests are carried out in the identification device in order to be able to positively recognize the situation, on the one hand, and prevent wrong identifications, on the other hand, and in order to identify in addition the side with low coefficients of friction or the side with high coefficients of friction, in case of need.

In general, the traction slip control system can receive most different input signals 21. The signals may e.g. comprise the wheel signals obtained from the wheel sensors. Apart therefrom, further sensor signals or secondary signals may be received and evaluated, as the requirement may be. To the extent provided, either direct sensor signals can be used, or conditioned (filtered) sensor signals or signals from a data bus can be used. Such sensorbased signals are referred to by reference numeral 21 irrespective of their origin.

Figure 3:
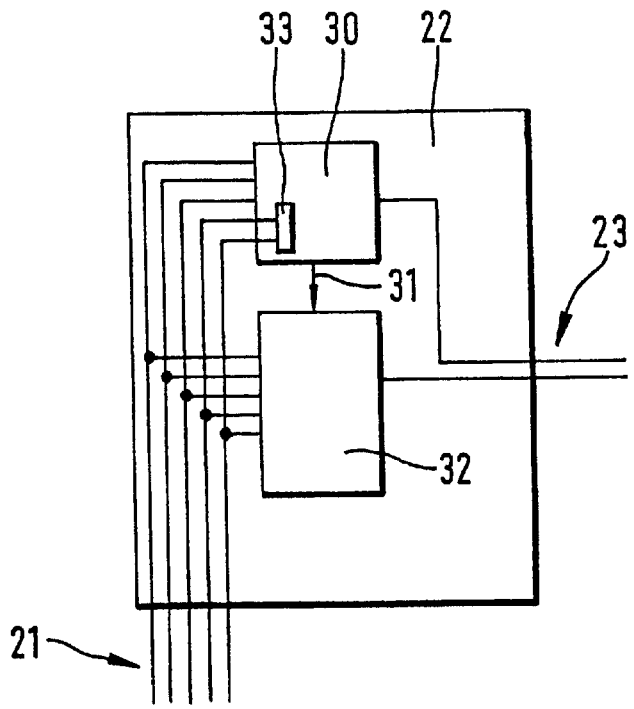
FIG. 3 shows the identification device of FIG. 2.

The identification device 22 is shown in greater detail in FIG. 3. It includes a determining device 30 by which the high coefficient-of-friction side or the low coefficient-of-friction side of the vehicle can be identified. The determining device 30 may e.g. comprise a comparison device 33 which permits comparing the slip amounts of the driven wheels. As one may a priori assume the same driving torque on both wheels, that wheel can be considered to be a wheel on the side with the lower coefficient of friction that has the higher amount of slip. Instead of the slip amounts of the driven wheels, the wheel speeds of these wheels may also be compared to each other. The identification device produces an output signal which characterizes the side with the high or with the low coefficient of friction.

Further, there is provision of a checking device 32 in which different checks can be performed. Individual, several, or all of the checks mentioned hereinbelow can be made:

A check is made whether the slip of the driven wheel on the high coefficient-of-friction side is above a first threshold value.

A check is made whether the slip of the driven wheel on the low coefficient-of-friction side is above a second threshold value.

A check is made whether the slip acceleration and/or the wheel acceleration of the driven wheel on the high coefficient-of-friction side is above a positive threshold value and whether the slip acceleration and/or the wheel acceleration of the driven wheel on the low coefficient-of-friction side are below a negative threshold value.

The brake pressures at the driven wheels are checked with respect to their value and/or compared to one another.

Both driven wheels must exhibit slip because the problem to be overcome by the present invention exists only then. The slip of the driven wheel on the high coefficient-of-friction side shall not become so high that conventional traction slip control systems will intervene. Therefore, the first threshold value shall lie below an intervention threshold of conventional traction slip control systems.

The slip acceleration or wheel acceleration of the high coefficient-of-friction wheel is polled and checked with respect to a positive threshold value. When the values are negative, this indicates decrease of the slip or of the wheel speed of the high coefficient-of-friction wheel. Intervention is not necessary in this case because automatic correction of the situation may be expected.

The slip acceleration or wheel acceleration of the low coefficient-of-friction wheel is also polled to prevent unnecessary interventions: when the acceleration is obviously negative, this indicates an excessive deceleration of the low coefficient-of-friction wheel so that a favorable result may be expected as a result of the intervention according to the present invention (pressure reduction on the low coefficient-of-friction wheel).

The brake pressure on the low coefficient-of-friction wheel shall be higher than a minimum value. The related threshold value for the minimum brake pressure, in the sense of a hysteresis, can be higher in the absence of the driving situation than in its presence. Preferably, the driving situation is only recognized when the brake pressure on the low coefficient-of-friction wheel is higher, at least by a defined amount, than the brake pressure on the high coefficient-of-friction wheel.

When the mentioned conditions prevail, the driving situation with sidewise different coefficients of friction can be identified, and depending on the number of criteria further taken into account, the identification also contains a judgment as to whether the envisaged intervention is appropriate or will be successful. When the checking device 32 comes to a positive result in total, it will issue a signal which, along with the signal of the determining device 30, can be output as a total signal 23. FIG. 3 shows two signal lines as an example. However, the identification device can also produce a signal 23 which is more complex and provides e.g. quantitative specifications.

Figure 4:
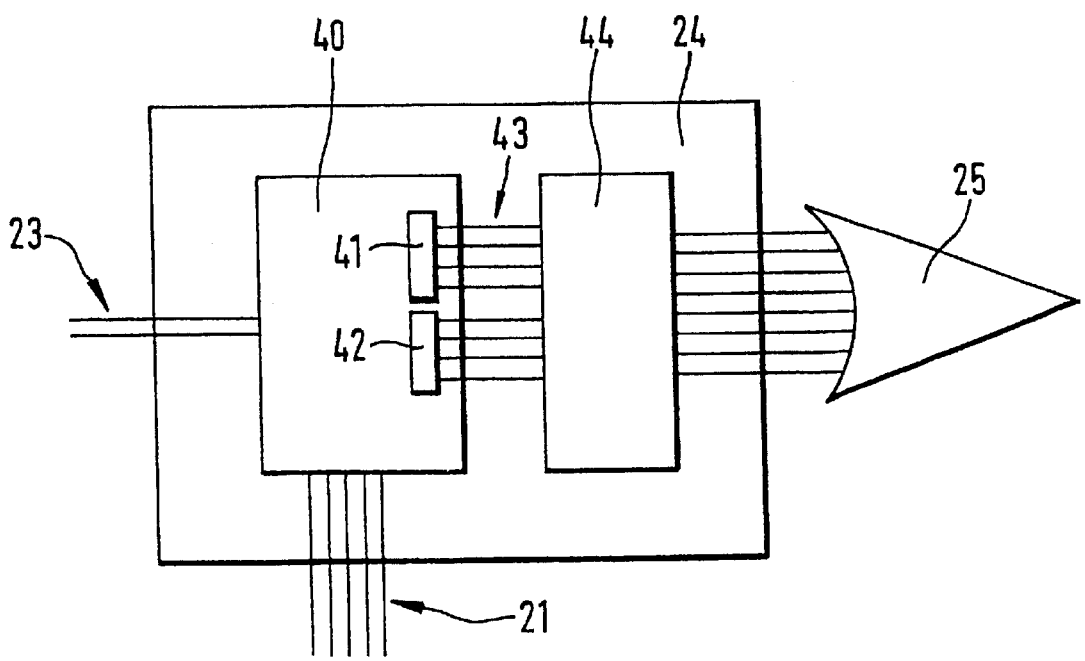
FIG. 4 shows the brake actuation control of FIG. 2.

When the identification device 22 outputs an identifying signal 23, the brake actuation control 24 will trigger brake pressure reduction on the low coefficient-of-friction side. The brake actuation control 24 is described in greater detail in FIG. 4. It comprises a nominal values output 40 and a control signal generation means 44. The nominal values output 40 can include a specification 41 for nominal pressure gradients and a specification 42 for nominal pressures. For example, when identification took place, a defined negative nominal gradient for the brake pressure of the wheel on the low coefficient-of-friction side may be adjusted, and this gradient in turn can depend on the running behavior (slip, speed, acceleration) of the low coefficient-of-friction wheel and/or the high coefficient-of-friction wheel. In the control signal generation means 44, actuating signals for the valves of the wheel brakes are generated according to the predetermined nominal values (nominal pressure, nominal gradient) and output as output signals 25 and, among others, supplied to the valve block.

Identification device 22 and brake actuation control 24, in turn, may receive input signals 21, especially wheel speeds, vehicle reference speed, brake pressure signals, and similar signals. The signals can be taken directly or indirectly from sensors, a vehicle data bus, or models (for example, brake pressure models).

In the traction slip control according to the present invention, traction slip on the high coefficient-of-friction side will exist for a comparatively short time only so that the pressure on the low coefficient-of-friction side will also be reduced for a comparatively short period only. The increase in traction slip which is the result has only so low an amount that driving comfort will not be reduced thereby.

When traction slip on the high coefficient-of-friction side exceeds a threshold value despite the measures taken, the brake slip can be controlled or regulated individually on this wheel. Thus, a higher amount of traction slip may occur temporarily on the high coefficient-of-friction side also in processes such as uphill driving maneuvers e.g. due to inertia moments in the drive train or due to a comparatively low coefficient of friction on the high coefficient-of-friction side. This situation will not satisfy the above-mentioned criteria for a pressure reduction on the low coefficient-of-friction wheel so that pressure reduction is not initiated there.

What is claimed is:

1. Method of controlling a traction slip of a vehicle on a roadway with sidewise different coefficients of friction, comprising the steps of:

identifying a driving situation on a roadway with sidewise different coefficients of friction and, when the driving situation is identified and traction slip is encountered on both wheels, decreasing the brake pressure on the driven wheel on the low coefficient-of-friction side, further including the steps of:

determining which vehicle side is the high coefficient-of-friction side and which is the low coefficient-of-friction side, checking whether the slip of the driven wheel on the high coefficient-of-friction side is above a first threshold value, checking whether the slip of the driven wheel on the low coefficient-of-friction side is above a second threshold value, checking whether an acceleration of the traction slip or a wheel acceleration of the driven wheel on the high coefficient-of-friction side is above a positive threshold value and whether the acceleration of the traction slip or the wheel acceleration of the driven wheel on the low coefficient-of-friction side is below a negative threshold value, and checking the brake pressures on the two wheels or comparing the brake pressures one to the other, wherein when checking the brake pressures, the brake pressure on the low coefficient-of-friction side is checked as to whether it is above a third threshold value, and the brake pressure on the high coefficient-of-friction side is checked as to whether it is below a fourth threshold value.

2. Method as claimed in claim 1, further including the step of comparing the amounts of slip or speeds of the driven wheels when fixing the high or low coefficient-of-friction side, and wherein the side on which the higher amount of slip prevail, is defined as the low coefficient-of-friction side.

3. Method as claimed in claim 1, wherein the first threshold value is set to be lower than a threshold value where traction slip control individually related to a wheel intervenes.

4. Method as claimed in claim 1, wherein when comparing the brake pressures a check is made whether the brake pressure on the high coefficient-of-friction side is below the brake pressure on the low coefficient-of-friction side at least by a defined amount.

5. Method as claimed in claim 1, further including using filtered values as wheel slip values.

6. Method as claimed in claim 1, further including the step of decreasing the brake pressure according to a definable gradient.

7. Method as claimed in claim 6, wherein the gradient is determined according to the slip or the acceleration of the traction slip of the wheel on the high coefficient-of-friction side or the wheel on the low coefficient-of-function side.

8. Method as claimed in claim 1, wherein the method is performed in addition to a traction slip control method which acts on the individual wheel, wherein the traction slip on the individual wheel is compared to a threshold which is responsive to the vehicle speed, and is changed by engine torque reduction or a wheel-individual brake pressure increase.

9. Device for controlling a traction slip of a vehicle on a roadway with sidewise different coefficients of friction, comprising:

an identification device for identifying a driving situation on a roadway with sidewise different coefficients of friction, a brake actuation control which decreases the brake pressure of the driven wheel on the low coefficient-of-friction side when the driving situation is identified and traction slip is encountered on both wheels, wherein the identification device includes the following components:

a determining device for determining which vehicle side is the high coefficient-of-friction side and which is the low coefficient-of-friction side, and a checking device for checking whether the slip of the driven wheel on the high coefficient-of-friction side is above a first threshold value, whether the slip of the driven wheel on the low coefficient-of-friction side is above a second threshold value, whether an acceleration of the traction slip or a wheel acceleration of the driven wheel on the high coefficient-of-friction side is above a positive threshold value, and whether the acceleration of the traction slip or the wheel acceleration of the driven wheel on the low coefficient-of-friction side is below a negative threshold value, and for checking the brake pressures on the two wheels or comparing the brake pressures one to the other, wherein the checking device checks the brake pressure on the low coefficient-of-friction side as to whether it is above a third threshold value, and checks the brake pressure on the high coefficient-of-friction side as to whether it is below a fourth threshold value.

10. Device as claimed in claim 9, wherein the determining device includes a comparison device for comparing the amounts of slip or speeds of the driven wheels, and that side on which the higher amount of slip or the higher speed prevails is defined as the low coefficient-of-friction side.

11. Device as claimed in claim 9, wherein the first threshold value is set to be lower than a threshold value where traction slip control individually related to a wheel intervenes.

12. Device as claimed in claim 9, wherein that when comparing the brake pressures a check is made as to whether the brake pressure on the high coefficient-of-friction side is below the brake pressure on the low coefficient-of-friction side at least by a defined amount.

13. Device as claimed in claim 9, wherein filtered values are used as wheel slip values.

14. Device as claimed in claim 9, wherein the brake actuation control includes a preset values output for predefining a nominal gradient for brake pressure decrease.

15. Device as claimed in claim 14, wherein the preset values output determines the gradient according to the slip or the acceleration of the traction slip of the wheel on the high coefficient-of-friction side or the wheel on the low coefficient-of-friction side.

16. Device as claimed in claim 9, further including means for comparing the traction slip on the individual wheel to a threshold which is responsive to the vehicle speed, and is changed by engine torque reduction or wheel-individual brake pressure increase.

17. Method of controlling a traction slip of a vehicle on a roadway with sidewise different coefficients of friction, comprising the steps of:

identifying a driving situation on a roadway with sidewise different coefficients of friction and, when the driving situation is identified and traction slip is encountered on both wheels, decreasing the brake pressure on the driven wheel on the low coefficient-of-friction side, further including the steps of:
  determining which vehicle side is the high coefficient-of-friction side and which is the low coefficient-of-friction side,
  checking whether the slip of the driven wheel on the high coefficient-of-friction side is above a first threshold value,
  checking whether the slip of the driven wheel on the low coefficient-of-friction side is above a second threshold value,
  checking whether an acceleration of the traction slip or a wheel acceleration of the driven wheel on the high coefficient-of-friction side is above a positive threshold value and whether the acceleration of the traction slip or the wheel acceleration of the driven wheel on the low coefficient-of-fiction side is below a negative threshold value, and checking the brake pressures on the two wheels or comparing the brake pressures one to the other,
  wherein when comparing the brake pressures a check is made whether the brake pressure on the high coefficient-of-friction side is below the brake pressure on the low coefficient-of-friction side at least by a defined amount.

18. Method of controlling a traction slip of a vehicle on a roadway with sidewise different coefficients of friction, comprising the steps of:
  identifying a driving situation on a roadway with sidewise different coefficients of friction and, when the driving situation is identified and traction slip is encountered on both wheels,
  decreasing the brake pressure on the driven wheel on the low coefficient-of-friction side, further including the steps of:
    determining which vehicle side is the high coefficient-of-friction side and which is the low coefficient-of-friction side,
    checking whether the slip of the driven wheel on the high coefficient-of-friction side is above a first threshold value,
    checking whether the slip of the driven wheel on the low coefficient-of-friction side is above a second threshold value,
    checking whether an acceleration of the traction slip or a wheel acceleration of the driven wheel on the high coefficient-of-friction side is above a positive threshold value and whether the acceleration of the traction slip or the wheel acceleration of the driven wheel on the low coefficient-of-friction side is below a negative threshold value, and checking the brake pressures on the two wheels or comparing the brake pressures one to the other,
  further including the step of decreasing the brake pressure according to a definable gradient.

19. Method as claimed in claim 18, wherein the gradient is determined according to the acceleration of the traction slop of the wheel on the high coefficient-of-friction side or the wheel on the low coefficient-of-friction side.

20. Device for controlling a traction slip of a vehicle on a roadway with sidewise different coefficients of friction, comprising:
  an identification device for identifying a driving situation on a roadway with sidewise different coefficients of friction,
  a brake actuation control which decreases the brake pressure of the driven wheel on the low coefficient-of-friction side when the driving situation is identified and traction slip is encountered on both wheels,
  wherein the identification device includes the following components:
    a determining device for determining which vehicle side is the high coefficient-of-friction side and which is the low coefficient-of-friction side, and
    a checking device for checking whether the slip of the driven wheel on the high coefficient-of-friction side is above a first threshold value, whether the slip of the driven wheel on the low coefficient-of-friction side is above a second threshold value, whether an acceleration of the traction slip or the wheel acceleration of the driven wheel on the high coefficient-of-friction side is above a positive threshold value, and whether the acceleration of the traction slip or the wheel acceleration of the driven wheel on the low coefficient-of-friction side is below a negative threshold value, and for checking the brake pressures on the two wheels or comparing the brake pressures one to the other,
  wherein that when comparing the brake pressures a check is made as to whether the brake pressure on the high coefficient-of-friction side is below the brake pressure on the low coefficient-of-friction side at least by a defined amount.

21. Device for controlling a traction slip of a vehicle on a roadway with sidewise different coefficients of friction, comprising:
  an identification device for identifying a driving situation on a roadway with sidewise different coefficients of friction,
  a brake actuation control which decreases the brake pressure of the driven wheel on the low coefficient-of-friction side when the driving situation is identified and traction slip is encountered on both wheels,
  wherein the identification device includes the following components:
    a determining device for determining which vehicle side is the high coefficient-of-friction side and which is the low coefficient-of-friction side, and
    a checking device for checking whether the slip of the driven wheel on the high coefficient-of-friction side is above a first threshold value, whether the slip of the driven wheel on the low coefficient-of-friction side is above a second threshold value, whether an acceleration of the traction slip or the wheel acceleration of the driven wheel on the high coefficient-of-friction side is above a positive threshold value, and whether the acceleration of the traction slip or the wheel acceleration of the driven wheel on the low coefficient-of-friction side is below a negative threshold value, and for checking the brake pressures on the two wheels or comparing the brake pressures one to the other,
  wherein the brake actuation control includes a preset values output for predefining a nominal gradient for brake pressure decrease.

22. Device as claimed in claim 21, wherein the preset values output determines the gradient according to the slip or the acceleration of the traction slip of the wheel on the high coefficient-of-friction side or the wheel on the low coefficient-of-friction side.

* * * * *

UNITED STATES PATENT AND TRADEMARK OFFICE
CERTIFICATE OF CORRECTION

PATENT NO.   : 6,533,367 B1 Page 1 of 1
DATED        : March 18, 2003
INVENTOR(S)  : Michael Latarnik et al.

It is certified that error appears in the above-identified patent and that said Letters Patent is hereby corrected as shown below:

Column 5,
Line 39, please change "slip prevail, is" to -- slip prevails is --.

Column 7,
Line 58, please change "slop of the wheel" to -- slip of the wheel --.

Signed and Sealed this

Eighth Day of July, 2003

JAMES E. ROGAN
*Director of the United States Patent and Trademark Office*